United States Patent [19]

Kurusu et al.

[11] Patent Number: 5,012,089

[45] Date of Patent: Apr. 30, 1991

[54] SCANNING BEAM CONTROL SYSTEM AND OPTICAL SCALE STRUCTURE USEFUL THERETO

[75] Inventors: Yasuo Kurusu; Masamichi Cho; Shinichi Nagata; Kunio Tomohisa; Hiroyuki Shirota, all of Kyoto, Japan

[73] Assignee: Dainippon Screen Mfg. Co., Ltd., Kyoto, Japan

[21] Appl. No.: 426,304

[22] Filed: Oct. 24, 1989

[30] Foreign Application Priority Data

Oct. 24, 1988 [JP] Japan .................. 63-2677817

[51] Int. Cl.⁵ .......................................... H01J 3/14
[52] U.S. Cl. .................................. 250/235; 358/494
[58] Field of Search ............ 250/234, 235, 236, 237 G; 358/494, 496

[56] References Cited

U.S. PATENT DOCUMENTS

| | | | |
|---|---|---|---|
| 4,638,156 | 1/1987 | Horikawa et al. | 250/235 |
| 4,661,699 | 4/1987 | Welmers et al. | 358/494 |
| 4,667,099 | 5/1987 | Arai et al. | 358/494 |
| 4,861,983 | 8/1989 | Sasada et al. | 250/235 |

FOREIGN PATENT DOCUMENTS 63-278020 11/1988 Japan .

Primary Examiner—David C. Nelms
Attorney, Agent, or Firm—Ostrolenk, Faber, Gerb & Soffen

[57] ABSTRACT

In an image recorder, a recording photobeam and a reference photobeam are periodically deflected by a polygon mirror in a main scanning direction. The recording photobeam is supplied to a photosensitive film while the reference beam is supplied to a transparent grating scale on which a transparent area and an opaque area are formed. The combination boundary of the transparent area and the opaque area has a portion parallel to the main scanning direction. The reference beam transmitted through the transparent area is detected, and the photobeams are deflected in a subscanning direction by an acoustic-optical deflector in response to the detected optical amount of the reference photobeam.

21 Claims, 13 Drawing Sheets

SCANNING BEAM CONTROL SYSTEM AND OPTICAL SCALE STRUCTURE USEFUL THERETO

BACKGROUND OF THE INVENTION

1. Field of the Invention

The present invention relates to a scanning beam control system in which a photobeam is modulated in accordance with an image signal while being deflected in order to scan a photosensitive material for each scanning line. In particular, the present system is suitable for an image recorder having a rotary optical deflector or a vibrating optical deflector such as a polygon mirror, a galvano mirror, a hologram disc or the like in order to conduct photolithography, photocopying, a process of producing printed circuit boards or the like.

In the present invention, attention is mainly directed to an improvement for automatically correcting, or compensating for deviation and nonlinearity of scanning lines in a subscanning direction that is orthogonal to a main scanning direction in which the photobeam is deflected by the optical deflector.

The present invention is also directed to an optical scale structure useful to the photobeam controlling system.

2. Description of Background Art

In scanning beam control systems having rotary or vibrating optical deflectors, a photobeam is deflected in a main scanning direction while being relatively progressed in a subscanning direction in order to two-dimensionally scan an imaging plane such as the surface of a photosensitive material. Accordingly, the quality of an image reproduced on the imaging plane depends on the linearity in the traces of the photobeam on the imaging plane, and it is required to maintain the linearity for obtaining a reproduced image at high quality.

However, since optical deflectors currently available have errors in deflecting a photobeam, the traces of the photobeam on the imaging plane deviate from designated scanning lines in the subscanning direction and desired traces of the photobeam on the imaging plane cannot be obtained without correcting or compensating the errors in the optical deflectors. Therefore, correction is required of the errors, such as inclination correction of mirror surfaces for polygon mirrors, wobbling correction of a mirror surface for galvano mirrors and correction of scan bow for hologram discs, for example.

U.S. Pat. No. 4,661,699 discloses a scanning beam control system employing a polygon mirror as an optical deflector in which the correction of these errors is attained. As shown in FIG. 14, the conventional system employs a ladder pattern or an optical grating structure in which plural pairs of a transparent area $T_p$ and an opaque area $S_d$ are linearly arrayed in the main scanning direction X such that respective tapered portions of the areas $T_p$ and $S_d$ are coupled to each other. The time span during which the photobeam passes through the transparent area $T_p$ in the main scanning direction X is detected and the shift of the photobeam path from a designated path in the subscanning direction Y is found according to the following principle:

Since the boundary between the transparent area $T_p$ and the photo-blocking area $S_d$ is inclined at the neighborhood of a reference line $Y=0$ defining a scanning line or a designated path of the photobeam, the time span for the photobeam to pass through the transparent area $T_p$ depends on the Y-coordinate of the photobeam path on the optical grating structure. For example, the time span required for the photobeam to pass through the transparent area $T_p$ along a line $Y=d$ as shown in FIG. 14 with a series of beam spots $BS_{d1}$, $BS_{d2}$ and $BS_{d3}$ is shorter than that for the reference line $Y=0$ as shown with another series of bean spots $BS_{01}$, $BS_{02}$ and $BS_{03}$. Therefore, when the quantitative change of the photobeam penetrating through the transparent area $T_p$ is detected and converted into an electric pulse, the shift d can be estimated by comparing the width of the electric pulse with that for the case where the photobeam scans along the reference line $Y=0$.

However, the conventional system is employable only in image recorders in which a main scanning speed on a scanned plane is constant, such as an image recorder whose imaging optical system has a polygon mirror and an f·θ lens. The reason is as follows:

In an image recorder having galvano mirror in place of a polygon mirror, for example, the width of the electric pulse obtained through the transparent area $T_p$ varies even if the photobeam path is not deviated from the reference line, since the main scanning speed on the scanned plane is not constant in one swing of the galvanometer mirror. In other words, the shift in the pulse width reflects not only the deviation of the photobeam path from the reference line but also the temporary change of the scanning speed. Consequently, if the conventional system is employed in such an image reorder, the scanning lines are undesirably bent on the scanned plane.

The foregoing are problems caused in general in image recorders in which the deflection speed of the photobeam is not constant. Other examples having this character are image recorders having hologram discs as photobeam deflectors, and those having f·sin θ lenses or f·tan θ lenses in place of the f·θ lenses. In the latter examples, the main scanning speed varies depending on the projection angle of the photobeam. In particular, when the galvano mirror is employed as a deflector, the curvature of the scanning lines varies for each scanning line since the scanning speed varies depending on subscanning coordinates as well as the main scanning coordinates, so that the scanning control often brings additional disturbance to the parallel array of scanning lines instead of correcting the shift of the scanning lines or the photobeam path.

Furthermore, even if a polygon mirror is employed, a precise scanning control cannot be attained in the case where the rotational speed of the polygon mirror is not uniform and has jitters. Similarly, if the scanned plane is considerably wide, the conventional control system as applied to an image recorder having an f·θ lens does not give straight scanning lines, since the scanning speed is not uniform over the scanned plane.

Therefore, the conventional system is quite restricted in its application.

Furthermore, since the change of the pulse width due to the shift of the photobeam path in the subscanning direction is very small, the sensitivity of the shift in the conventional system is low even if the system is employed in an image recorder whose scanning speed is constant.

Additionaly, the pulse width becomes narrow as the imaging speed is increased in image recorders such as a laser plotter, and therefore, the detection of the pulse width is often influenced by electoric noises generated in electronic circuits such as a comparator.

SUMMARY OF THE INVENTION

The present invention is directed to a system for controlling scanning of a photobeam along scanning lines defined on an object plane.

According to the present invention, the system comprises means for generating first and second photobeams propagating in parallel with each other, and having first deflector means electrically controllable for deflecting the first and second photobeams in a first direction; second deflector means for periodically deflecting the first and second photobeams in a second direction; separator means for separating the first and second photobeams from each other so that the first photobeam is directed to the object plane and the second photobeam is directed to a predetermined first space region; scale means provided at the first space region for receiving the second photobeam, and having a first surface on which a periodic scale pattern extending in the second direction is formed, wherein the periodic scale pattern essentially consists of a linear periodic array of unit patterns each of which includes a spatial combination of first and second areas whose optical characters are different from each other, and a combination boundary of the first and second areas includes a first portion parallel to the second direction, photoelectric means for receiving a light transmitted from the scale means and photo-electrically converting the light into a first electric singal; circuit means for receiving the first electric signal and calculating a first difference between a level of the first electric signal and a first threshold level to generate a second electric signal in accordance with the first difference; and means for transmitting the second electric signal to the first deflector means in order to change respective deflection angles of the first and second photobeams in the first direction.

Since the second photobeam is deflected together with the first photobeam, a deflection error which may be caused in the first photobeam can be monitored by detecting the position of the beam spot which is formed on the scale means by the second photobeam. The scale means has a structure suitable for detecting the position of the beam spot in a direction perpendicular to the second direction. That is, the combination boundary of the first and second areas has the first portion extending in the second direction, and therefore the deviation of the scanning path therefrom can be detected by measuring the optical amount of the second photobeam which is transmitted through or reflected by the periodic scale patterns.

It should be noted that the transmitted or reflected optical amount depends on the positional deviation of the beam spot from the first part and is independent of the scanning speed. Consequently, even if the scanning speed is fluctuated, accurate detection of the deviation and precise compensation thereof can be attained. Due to this advantageous character, the present invention is effective for controlling scanning systems employing: an f·θ lens; an f·tan θ lens; and f·θ for projecting a photobeam onto a wide object plane; a galvano mirror; or another optical element which may cause fluctuations in the scanning speed of photobeams, as well as systems employing an f·θ lens causing no fluctuations.

Furthermore, since the scanning deviation or the deflection error is detected by measuring the level of the optical amount rather than by measuring the timing character of the waveform representing the optical amount, the scanning control for compensating inclinations of mirror surfaces in a polygon mirror or the like can be precisely attained even if the scanning speed is increased and electric noises are applied to the system.

Preferably, the first electric signal obtained by measuring the second photobeam transmitted from the scale means is given to a shading correction circuit for normalizing the respective peaks of the first electic signal. The first electric signal has a waveform in which a peak, a flat step and a bottom valley appear periodically and cyclically. The deviation of the second photobeam from the first portion of the combination boundary or a reference line appears as a level shift of the flat step level in the wafeform of the first electric signal.

In order to detect the deviation from the reference line precisely, an index value representing the flat step level in relative scale may be introduced. The index value is compared with a threshold value, and the difference therebetween is used for generating the second electric signal for driving the first deflector such as an acoustic optical deflector.

In the present invention, the terms the "first and second directions" are defined on coordinate systems fixed to respective photobeams. Therefore, these directions are local ones which may change according to the change in the propagating directions of the photobeams rather than absolute ones defined in an absolute coordinate space in which the system is provided.

Accordingly, an object of the present invention is to provide a scanning beam control system for correcting deflection errors and maintaining linearity of scanning lines on an object plane even if errors and non-linearity are caused in a deflector and other optical elements.

Another object is to maintain the linearity of the scanning line even if the scanning speed varies.

Another object is to attain a precise control of photobeams without being influenced by electric noises even if the scanning speed is increased.

These and other objects, features, aspects and advantages of the present invention will become more apparent from the following detailed description of the present invention when taken in conjunction with the accompanying drawings.

DESCRIPTION OF PREFERRED EMBODIMENTS

A. Overall Structure and Operation

Figure 2:
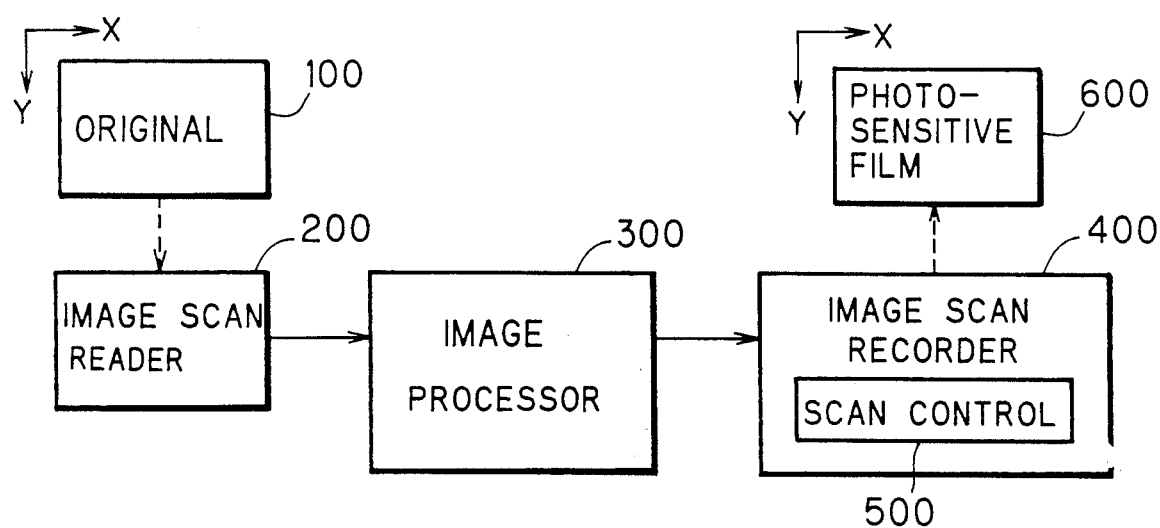
FIG. 2 is a block diagram of a process scanner to which the preferred embodiment is applied.

FIG. 2 is a schematic block diagram showing a process scanner in which a scanning beam-control system according to a preferred embodiment of the present invention is provided. The image on an original 100 is photoelectrically read by an image scan reader 200 for each pixel. The image signal thus obtained is transmitted to an image processor 300. The image processor 300 is operable to conduct enhancement of the image contour and other image processings, and the processed image signal is delivered to an image scan recorder 400. The image scan recorder 400 comprises a scanning beam-control system 500, details of which will be described later. The image signal is converted into a halftone dot signal in the image scan recorder 400, which is used for modulating a photobeam. The modulated photobeam is periodically deflected in order to scan the surface of a photosensitive film 600 while relatively moving the photosensitive film 600 and a recording head of the image scan recorder 400, whereby a latant halftone dot image is formed for each scanning line on a region of the film 600 exposed to the modulated photobeam. In FIG. 2, the arrows X and Y denote a main scanning direction and a subscanning direction, respectively.

Figure 1A:
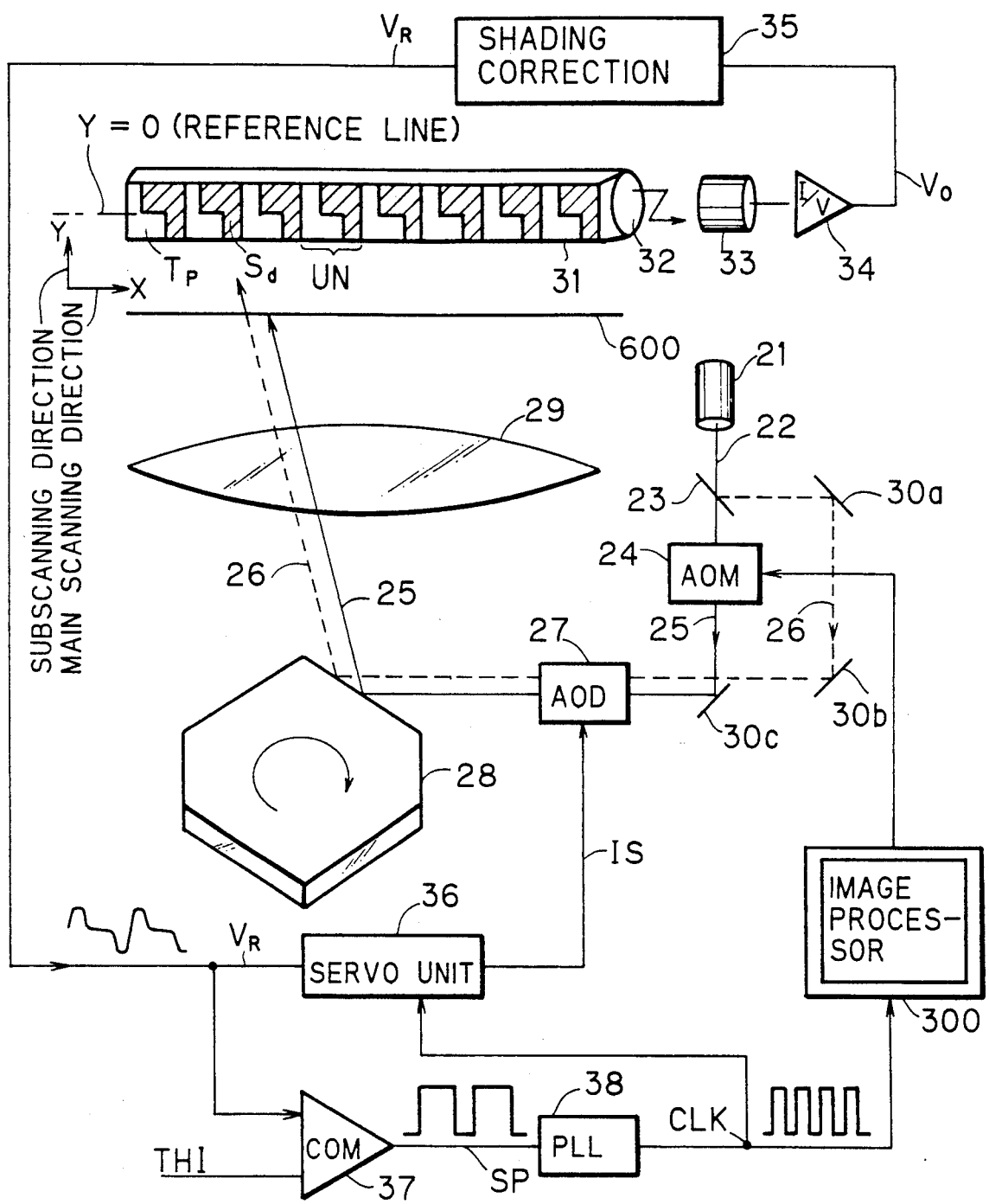
FIG. 1A schematically illustrates a scanning beam-control system according to a preferred embodiment of the present invention that is provided in an image scan recorder.
Figure 1B:
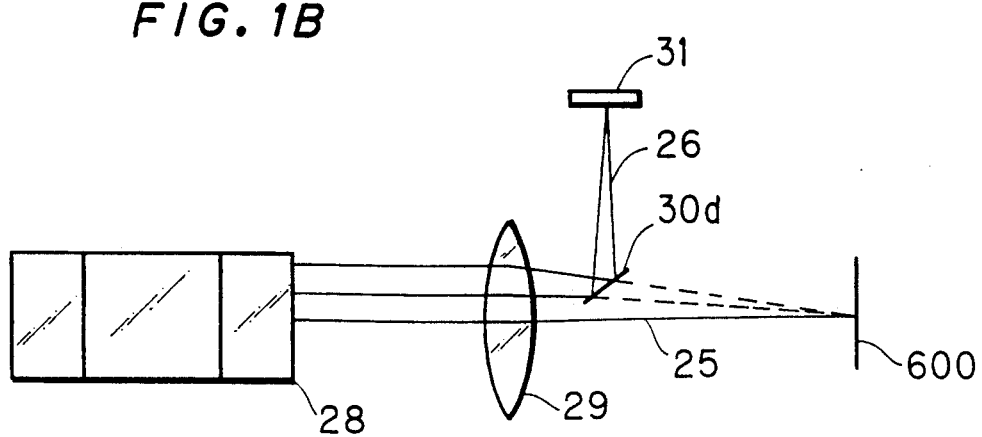
FIG. 1B is a side view of a part of the optical system shown in FIG. 1A.

FIG. 1A is a schematic diagram showing a part of the image scan recorder 400, in which respective elements of the scanning beam control system 500 are provided. A part of the optical system included therein is depicted in FIG. 1B as a schematic side view. A photobeam 22 generated in a light source 21 such as a laser oscillator is split into two beams by a beam splitter or a half mirror 23. One of the two beams passes through the half mirror 23 and an acoustic optical modulator (AOM) 24 to become a first photobeam or a recording beam 25, which is used for recording an image on the photosensitive film 600. The other beam which is reflected by the half mirror 23 is further reflected by a pair of mirrors 30a and 30b while bypassing the AOM 24, to become a second photobeam or a reference beam 26 which is referred to for controlling the scanning of the recording beam 25.

The AOM 24 is supplied with the halftone dot image signal from the image processor 300 for each scanning line, and in response to the image signal, the AOM 24 modulates the recording beams 25 in an ON-OFF modulation fashion. The recording beam 25 is reflected by a mirror 30c, whereby respective light paths of the photobeams 25 and 26 become parallel to each other. The recording beam 25 and the reference beam 26 then pass through an acoustic optical deflector (AOD) while being deflected by the AOD 27 in a direction equivalent to the subscanning direction. The deflection by the AOD 27 is that for compensating deviations or shifts of scanning traces from prescribed scanning lines on the photosensitive film 600, and details thereof will be described later. The recording beam 25 and the reference beam 26 are then reflected by a polygon mirror 28. The polygon mirror 28 is rotated at a constant angular velocity, and the photobeams 25 and 26 are periodically deflected in the main scanning direction. The polygon mirror serves as a main deflector for attaining a main scanning of the photosensitive film 600 with the recording beam 25 and a scanning of a grating scale 31 with the reference beam 26 where the former scanning is that for image recording and the later is that for deflection correction.

As shown in FIG. 1B, the deflected recording beam 25 is then supplied to a lens 29 and focused on the surface of the film 600 in order to scan the film in the main scanning direction. The subscanning of the photosensitive film 600 is attained by relatively moving the film 600 and the optical system in the subscanning direction with a mechanical system (not shown). The lens 29 may be an f·θ lens, an f·sin θ lens, an f·tan θ lens or the like. On the other hand, the reference beam 26 passes through the lens 29 and is then reflected by a mirror 30d toward the grating scale 31 on which a periodic scale pattern or a grating pattern is formed (see FIG. 1A).

Respective scanned surfaces of the grating scale 31 and the photosensitive film 600 are located at optically equivalent or conjugate positions, whereby the position of the recording beams 25 on the scanned surface of the photosensitive film 600 can be monitored by detecting the position of the reference beam 26 on the grating scale 31. As shown in FIG. 1A, the grating scale 31 is a transparent bar member having a flat surface on which unit patterns UN each consisting of a transparent area $T_p$ and an opaque area $S_d$ are periodically and linearly arrayed in the axial direction of the bar member corresponding to the main scanning direction X. Further details of the pattern array will be described later.

The reference beam 26 penetrating the transparent area $T_p$ of the grating scale 31 enters an optical guide rod 32 which is attached to the rear surface of the grating scale 31. The reference beam 26 is guided in the optical guide rod 32 and goes out from one end of the rod 32. A photo-diode 33 is provided at the end of the rod 32, whereby the reference beam 26 is converted into an electric current. Then, the electric current is converted into a voltage signal $V_0$ by a current/voltage converter 34.

Since the transparent areas $T_p$ and the opaque areas $S_d$ are periodically and alternately arrayed, the optical amount of the reference beam 26 reaching at the photodiode 33 changes periodically when the reference beam 26 sweeps the grating scale 31 in the main scanning direction X. Consequently, the voltage level of the signal $V_0$ also changes periodically. However, even if the scanning of the grating scale 31 with the reference beam 26 is precisely controlled, the waveform of the signal $V_0$ is not vigorously periodic but slightly deviates from a perfect periodic one. This is because the incident angle and the incident position of the reference beam 26 on the grating scale 31 changes as the reference beam 26 sweeps the scale 31, while the optical transmittivity on the transparent areas $T_p$ is not constant but depends on the incident angle and the incident position. Therefore, the signal $V_0$ is inputted to a shading correction circuit 35 in order to compensate the non-periodicity and normalize respective peak levels in the waveform of the signal $V_0$.

Through the shading correction, the signal $V_0$ becomes a corrected signal $V_R$ having periodic peaks whose heights are identical to each other and representing instantaneous relative amplitudes of the transmitted reference beam in peak-to-peak periods. The signal $V_R$ is then transmitted to a servo unit 36 serving as a controller of the AOD 27. On the basis of the relative amplitudes represented by the signal $V_R$, the servo unit 36 calculates the incident deviation in the subscanning direction Y of the reference beam 26 from a reference line $Y=0$ defined on the grating scale 31 to generate a deflection control signal IS whose level is in proportion to the deviation. The control signal IS is fetched by the AOD 27, whereby the photobeams 25 and 26 are deflected in the subscanning direction such that the reference beam 26 always scans the grating sale 31 on the reference line $Y=0$. Accordingly, the inclination of mirror surfaces which may be caused in the polygon mirror 28 can be compensated by the operation of the feed-back control loop. The shading correction circuit 35 may be provided in the servo unit 36 rather than provided separately.

The signal $V_R$ is transmitted also to a comparator 37. The comparator 37 compares the level of the signal $V_R$ with a reference signal having a predetermined threshold level TH1 to generate a pulse signal SP which is at a high level during $V_R > TH1$. The leading edges of the pulse signal SP indicate respctive time points at which the reference beam 26 reaches at respective front edges of the unit patterns UN in the main scanning direction X. The pulse signal SP is inputted to a phase-locked loop (PLL) 38 and the frequency thereof is multiplied by a predetermined factor, to thereby obtain a clock signal CLK for controlling the timing of the main scanning in the image recording. The clock signal CLK is supplied to the servo unit 36, the image processor 300 and other devices (not shown).

B. Construction and Operations of Respective Parts

Figure 3A:
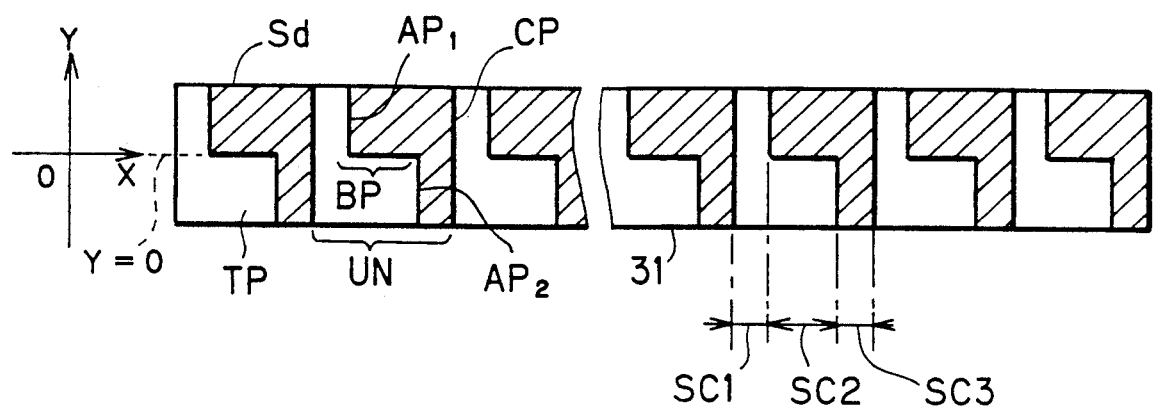
FIG. 3A illustrates a periodic scale pattern formed on a grating scale.

Referring to FIG. 3A, there is shown the face pattern of the grating scale 31 in connection with the orientation thereof. The face pattern has a periodic array of the unit patterns UN aligned in the scanning direction X of the reference beam 26. Although the scanning of the reference beam 26 is not a two-dimensional scanning attained by a combination of a main scanning and a subscanning but a one-dimensional scanning in the direction X, the direction X on the grating scale 31 will be called as "the main scanning direction" since the direction X corresponds to the main scanning direction of the recording beam 25 (FIG. 1A) which sweeps a two-dimensionnal area on the photosensitive film 600 by a combination of main scanning in the direction X and subscanning in the direction Y.

The unit pattern UN has the transparent area $T_p$ which is hook-shaped as in the capital letter "L" and the opaque area $S_d$ which is in the reverse shape of the capital letter "L". The opaque areas $S_d$ may be formed by selectively coating the transparent face of the grating scale 31 with an opaque material. The first boundary between the transparent area $T_p$ and the opaque areas $S_d$ neighboring thereon consists of three parts $AP_1$, $AP_2$ and BP. The first and second parts $AP_1$ and $AP_2$ are straight lines extending in the direction Y at different X-positions, and the third part BP is another straight line extending in the direction X and connecting the respective terminal points of the first and second lines $AP_1$ and $AP_2$ to each other along the reference line $Y=0$. The second boundary is a straight line CP extending in the direction Y. In the following description, the lines $AP_1$ and $AP_2$ and CP are called as "vertical boundaries", while the line BP is called as "a lateral boundary". In the section where the lateral boundary BP is provided, the optical transmission characters at respective X-coordinate values are opposite between the upper region $Y>0$ and the lower region $Y<0$, and the optical amount of the reference beam 26 transmitting through the grating scale 31 drastically changes if the scanning path of the reference beam 26 deviates from the reference line $Y=0$.

Figure 3B:
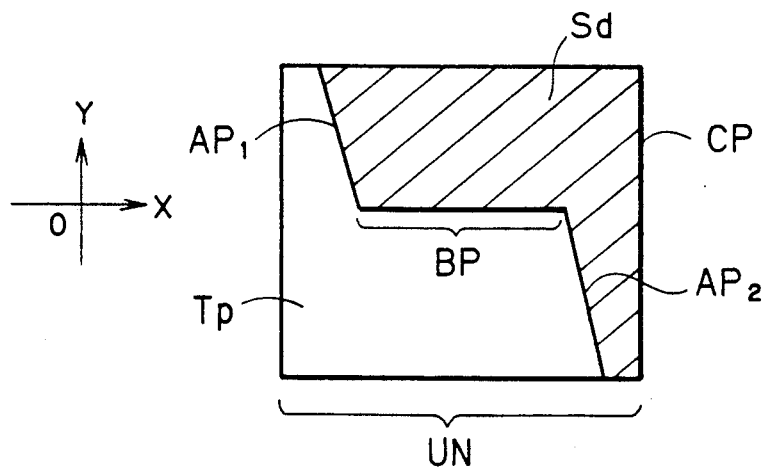
FIG. 3B illustrates a part of another scale pattern employable in place of that shown in FIG. 3A.

FIG. 3B illustrates another example of the unit pattern, in which the first part $AP_1$ and the second part $AP_2$ are inclined from the direction Y toward the direction X. The inclination angle is common to the parts $AP_1$ and $AP_2$. Other patterns comparable to the pattern shown FIG. 3B may be also employed as the unit pattern.

Figure 4C:
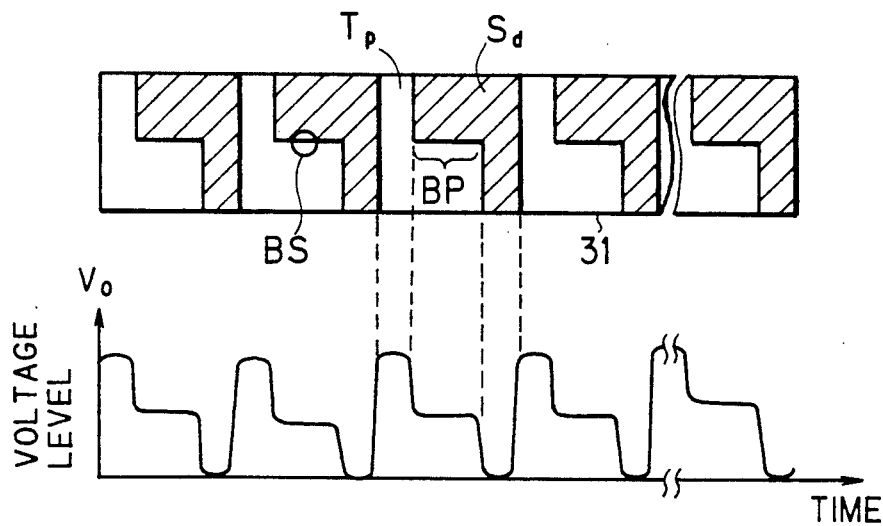
FIG. 4C illustrates the relationship between respective positions on the grating scale and the respective levels on the waveform of the signal $V_0$.
Figure 4A:
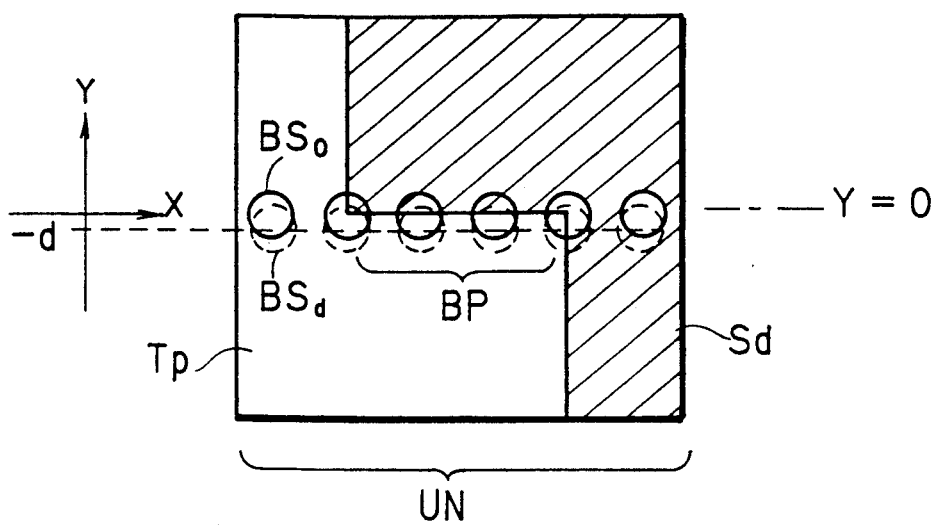
FIG. 4A illustrates respective sequences of beam spots on an unit pattern.
Figure 4B:
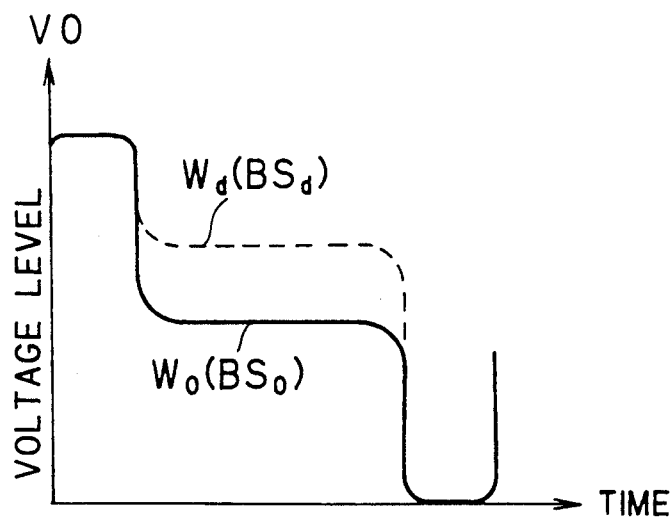
FIG. 4B is a timing chart of an electic signal $V_0$ within an unit time period.

The system comprising grating scale 31, the optical guide rod 32, the photo-diode 33 and the I/V converter 34 is operable to convert the reference beam 26 into the electric signal $V_0$, as is described above. The conversion character of the photoelectric conversion system is as follows:

Referring to FIG. 4A, a series of beam spots $BS_0$ depicted on the unit pattern UN by solid circles indicates a scanning trace of the reference beam 26 (FIG. 1A) running on the reference line $Y=0$, while another series of beam spots $BS_d$ depicted by the dotted circles indicates a scanning trace shifted downward from the reference line $Y=0$. FIG. 4B illustrates the voltage level of the signal $V_0$ as a function of the clock time or the temporary location of the beam spot in the scanning of the reference beam 26, where the waveforms $W_0$ and $W_d$ are those for the series of the beam spots $BS_0$ and $BS_d$, respectively.

If the reference beam 26 scans the grating scale 31 just on the reference line $Y=0$, one half of the beam spot $BS_0$ transmits through the transparent area $T_p$ time the beam spot $BS_0$ sweeps the lateral boundary BP, so that a flat step at the center level appears in the waveform $W_0$. On the other hand, if the scanning path of the reference beam 26 deviates from the reference line $Y=0$ by $(-d)$, most of the beam spot $BS_d$ transmits through the transparent area $T_p$, whereby the level of a flat step in the waveform $W_d$ is increased as shown by a dotted line in FIG. 4B. When the deviation is $(+d)$ rather than $(-d)$, the step level is decreased. Consequently, the step level in the signal $V_0$ reflects well the deviation of the scanning trace of the reference beam 26.

FIG. 4C is a timing chart illustrating an overall waveform of the signal $V_0$. The signal $V_0$ is at the maximum level thereof time the whole of the beam spot BS is located in the transparent area $T_p$, and is at the minimum level time the whole of the beam spot BS is in the opaque area $S_d$. The voltage level is between the maximum and minimum levels time the beam spot BS is on the boundary between the areas $T_p$ and $S_d$, i.e., the lateral boundary BP. The same waveform can be obtained if another photoelectric conversion element such as a phototransistor is employed in place of the photodiode 33.

Since the lateral boundary BP is parallel to the main scanning direction X and the intensity distribution in the beam spot is a Gaussion distribution, the deviation of the beam spot in the direction Y can be detected at a high sensitivity. Furthermore, the quantitative relation between the voltage level $V_0$ and the positional deviation of the beam spot BS is not varied even if the scanning speed is varied, and therefor the deviation of the scanning path from the reference line $Y=0$ can be precisely detected regardless of fluctuations in timings of the scan.

Figure 5A:
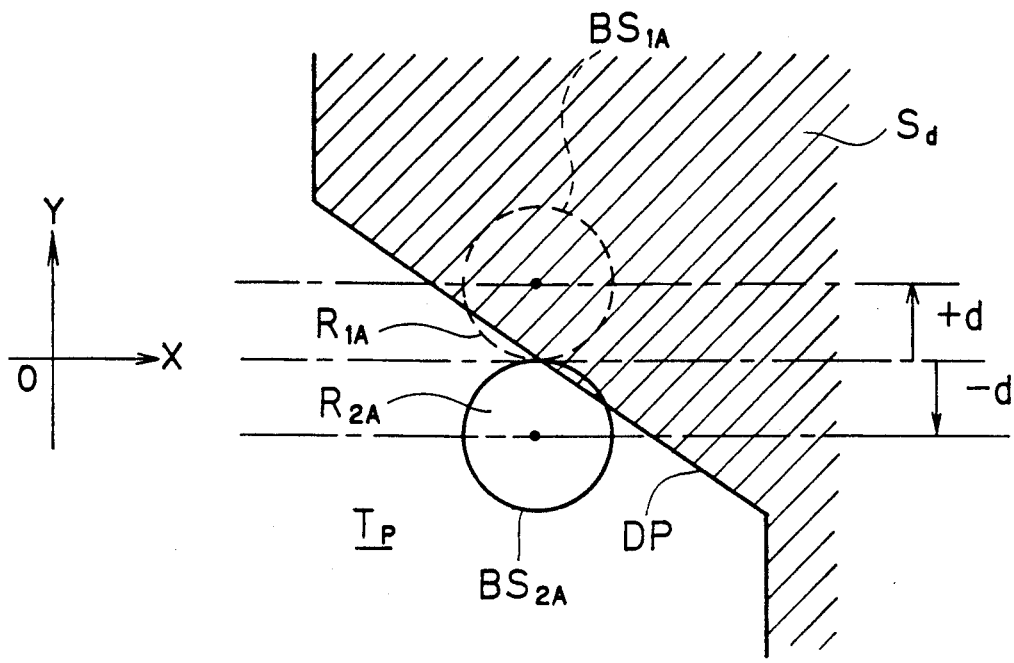
FIG. 5A illustrates a part of a conventional scale pattern.
Figure 5B:
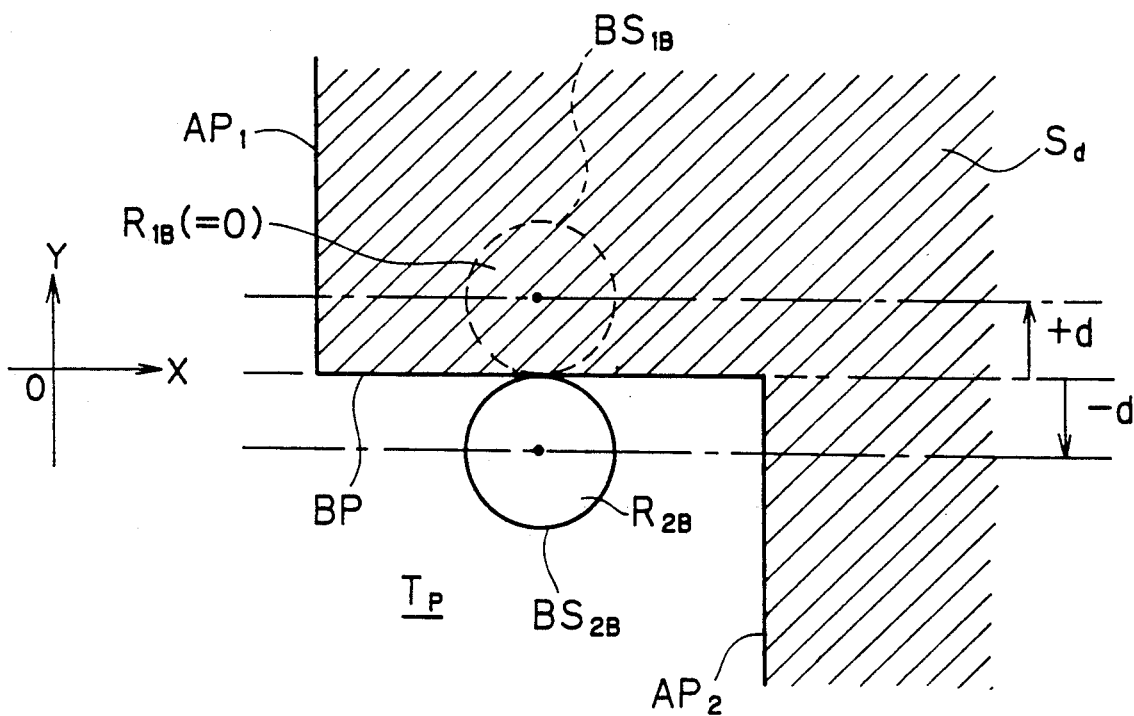
FIG. 5B illustrates a part of the unit pattern according to the preferred embodiment, by which an advantage of the present invention will be described while being compared with FIG. 5A.

In order to more fully clarify these advantages, the grating pattern according to the preferred embodiment of the present invention is compared with the grating pattern disclosed in the U.S. Pat. No. 4,661,699. As has been described, the U.S. Patent employs the pattern shown in FIG. 14. FIG. 5A is a diagram showing a part of the pattern boundary, where the diameter of the beam spot is enlarged for ease of the illustration. Beam spots deviating from the reference line $Y=0$ by $(+d)$ and $(-d)$ are depicted in FIG. 5A as beam spots $BS_{1A}$ and $BS_{2A}$, respectively. On the other hand, a part of the pattern boundary according to the present invention is shown in FIG. 5B, where the deviated beam spots $BS_{1B}$ and $BS_{2B}$ are depicted in form comparable with FIG. 5A. Although the absolute value d of the deviation is identical to the radius of the beam spots in the examples shown in FIG. 5A and FIG. 5B, the following analysis can be also applied to other cases.

From FIG. 5A and FIG. 5B, the following equations (1) and (2) are obtained:

$$\Delta R_A = R_{1A} - R_{2A} \quad (1)$$

$$\Delta R_B = R_{1B} - R_{2B} \quad (2)$$

where
- $R_{1A}$, $R_{2A}$ = the areas of respective parts of beam spots $BS_{1A}$ and $BS_{2A}$ located on the transparent area $T_p$ in FIG. 5A,
- $R_{1B}$, $R_{2B}$ = the areas of respective parts of beam spots $BS_{1B}$ and $BS_{2B}$ located on the transparent area $T_p$ in FIG. 5B,
- $\Delta R_A$ = the difference between the areas $R_{1A}$ and $R_{2A}$, which is reflected in the difference between the respective signal levels $V_0$ for the $(+d)$ deviation and the $(-d)$ deviation in the conventional system, and
- $\Delta R_B$ = the difference between the areas $R_{1A}$ and $R_{2A}$, which is reflected in the difference between the respective signal levels $V_0$ for the $(+d)$ deviation and the $(-d)$ deviation in the present invention.

Since:
$R_{1B} = 0$,
$R_{2B} = R$ (the whole area of one beam spot),
$0 < R_{1A} < R$, and
$0 < R_{2A} < R$,
the following expressions (3) and (4) are obtained.

$$\Delta R_A < R \quad \ldots (3)$$

$$\Delta R_B = R \quad \ldots (4)$$

Therefore, the difference between respective signal levels $V_0$ detecting the beam spots $BS_{1B}$ and $BS_{2B}$ in the present invention is larger than that for the beam spots $BS_{1A}$ and $BS_{2A}$ in the conventional system, and it is understood that the present invention gives a high sensitivity in detection of the beam deviation.

Figure 14:
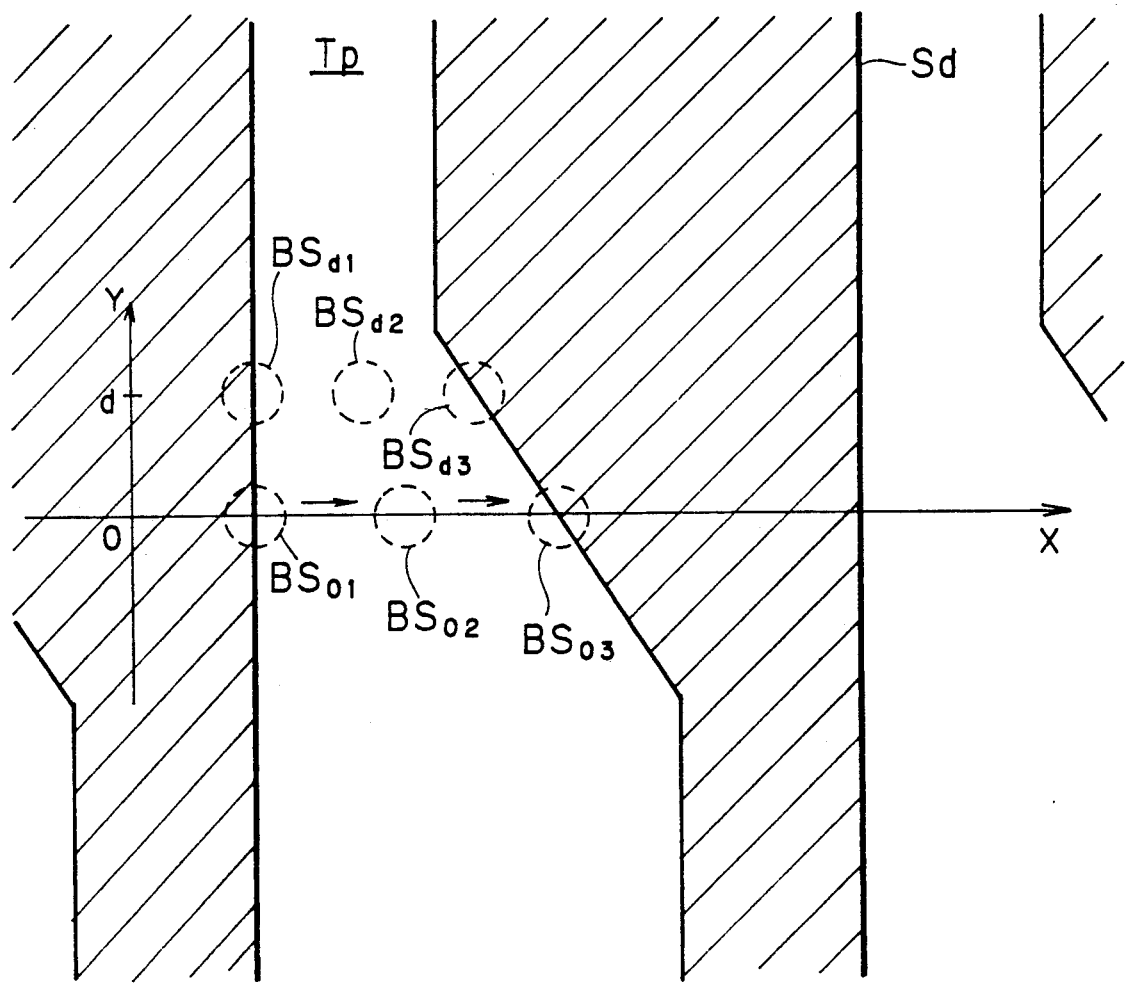
FIG. 14 illustrates a part of the conventional scale pattern.

Furthermore, the conventional technique shown in FIG. 14 and FIG. 5A has another disadvantage in that the deviation of the photobeam is hardly detected by detecting the change of the transmitted optical amount unless the scanning speed is precisely controlled. That is, it is required in the conventional technique to detect the optical amount at the same X-position in respective scanning cycles since the boundary between the transparent area $T_p$ and the photo-blocking area $S_d$ is inclined and the transmitted optical amount depends on the X-coordinate of a sampling point even if the photobeam is scanned just on the line $Y=0$.

For example, although both of the beam spots $BS_{02}$ and $BS_{03}$ are just on the line $Y=0$, the respective transmitted optical amounts are different each other and the result of the detection is not common to both of the cases where the transmitted optical amount is detected at the positions of the beam spots $BS_{02}$ and $BS_{03}$, respectively. The discrepancy between the sampled amounts in respective scanning cycles can be prevented only when the scanning speed is constant and the transmitted optical amount can be always detected at a same position. However, the constant scanning speed is hardly attained in the systems employing an $f\cdot\sin\theta$ lens or an $f\cdot\tan\theta$ lens. Even if an $f\cdot\theta$ lens is employed, a quite accurate control system is required, which results in increased cost.

On the other hand, the transmitted optical amount can be detected in the present invention without ambiguity depending on the sampling position even if the scanning speed fluctuates. This is because the boundary part BP is parallel to the X-direction, and a sampled value does not depend on the sampled position within the boundary part BP. Therefore, the grating scale 31 according to the present invention can be employed in the scanning systems having an arbitrary lens.

Figure 6A:
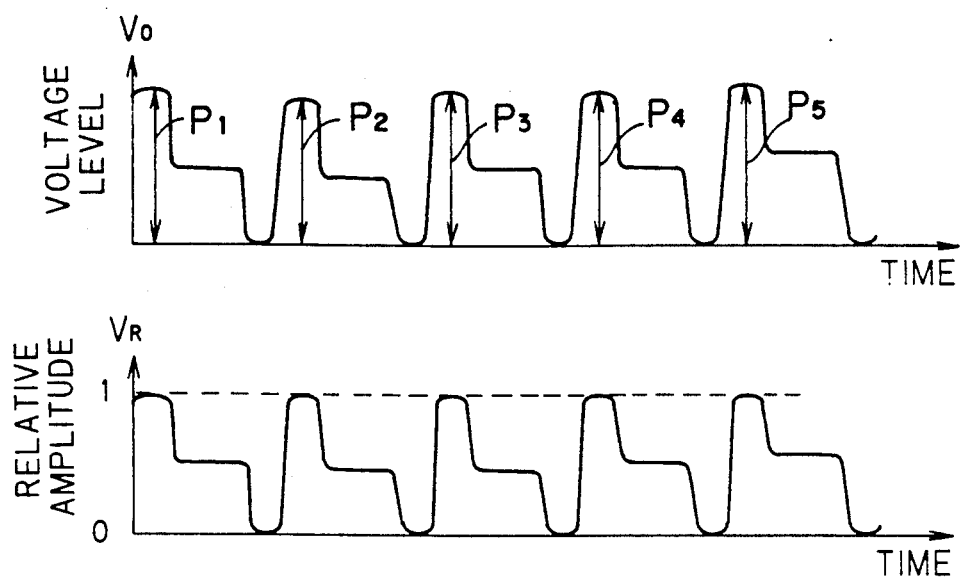
FIG. 6A illustrates respective timing charts of signals $V_0$ and $V_R$.

The signal $V_0$ thus obtained is delivered to the shading correction circuit 35 (FIG. 1A) in order to normalize the respective peak levels in the periodic waveform, details of which are as follows. First, the respective peak levels $P_1$, $P_2$, $P_3$, $P_4$ and $P_5$ shown in FIG. 6A are serially detected by means of a peak holder provided in the circuit 35. Then, the respective levels in each period are divided by the corresponding peak level with a divider provided in the circuit 35 to obtain the relative amplitudes $V_R$ shown in FIG. 6A. Through such detection and division, the respective peak levels are normalized to "1", so that various errors caused in the photoeletric conversion of the detected reference beam 26 are compensated. Since the division is performed for each period in series, the signal is not long delayed in the process of division.

The signal representing the relative amplitudes $V_R$ is transmitted to the servo unit 36 (FIG. 1A). The relative amplitudes $V_R$ have values within the range $0 \leq V_R \leq 1$, and take the value $V_R = 1$ when such values whole of the beam spot BS is located in the transparent area $T_p$ while the take the value $V_R=0$ when the whole of the beam spot BS is located in the opaque area $S_d$.

On the other hand, when the beam spot BS is located on the lateral boundary BP, the relative amplitudes $V_R$ takes a value between "0" and "1" so that a flat step whose width is in proportion to the length of the lateral boundary BP is formed in the waveform of the relative amplitudes $V_R$.

Figure 6B:
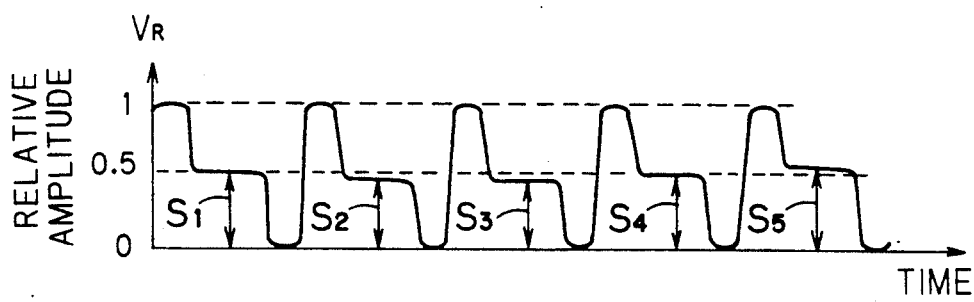
FIG. 6B is a timing chart of the signal $V_R$, where flat step levels are depicted as $S_i$ (i=1-5)

The servo unit 36 receives the signal $V_R$ and detects respective levels at the peak, the bottom and the flat step of the signal $V_R$ for each period. The peak level is $V_R=1$ and the bottom level is $V_R=0$ while the flat step level is $S_1$, $S_2$, $S_3$, $S_4$ or $S_5$ (see FIG. 6B) depending on the period in which the detection is currently conducted. Then, the servo unit 36 calculates an index value A by the following equation (5) for each $i=1, 2, 3, \ldots$ :

$$A = \frac{(\text{the flat step level } S_i) - (\text{the bottom level})}{(\text{the peak level}) - (\text{the bottom level})} \quad (5)$$

As understood from the equation (5), the index value A represents a normalized deviation of the beam spot. Since the peak level and the bottom level are "1" and "0", respectively, therefore the equation (5) is logically equivalent to the following equation (6):

$$\begin{aligned} A &= (S_i - 0)/(1 - 0) \\ &= S_i \end{aligned} \quad (6)$$

However, since the values "1" and "0" may be represented by arbitrary voltage levels, e.g., 5 volts and 0 volt, the subtractions and the division in the equation (5) are meaningful for obtaining the normalized index value A in practice. Preferably, the flat step level $S_i$ in the equation (5) is obtained by sampling a plurality of levels in the flat step and averaging the plurality of levels.

During the time the reference beam 26 scans the grating scale 31 just on the lateral boundary BP or the reference line $Y=0$, the index value A is 0.5. If the reference beam 26 deviates from the reference line $Y=0$ toward the opaque area $S_d$, the index value A is $A<0.5$. On the contrary, if the reference beam 26 deviates from the reference line toward the transparent area $T_p$, the index value A becomes $A>0.5$.

The servo unit 36 serially calculates the index value A for each period corresponding to the unit pattern UN, and further calculates the difference $\Delta A = A - 0.5$ between the index value A and the reference value 0.5 to generate the deflection control signal IS in proportion to the difference $\Delta A$. In response to the signal IS, the AOD 27 changes the deflection angle of the photobeams 25 and 26 so that the reference beam 26 scans the reference line $Y=0$. In other words, the feedback loop takes the deviated reference beam 26 back to the reference line $Y=0$ by changing the deflection angle at the AOD 37 until the index value A returns to the reference value 0.5.

Figure 7A:
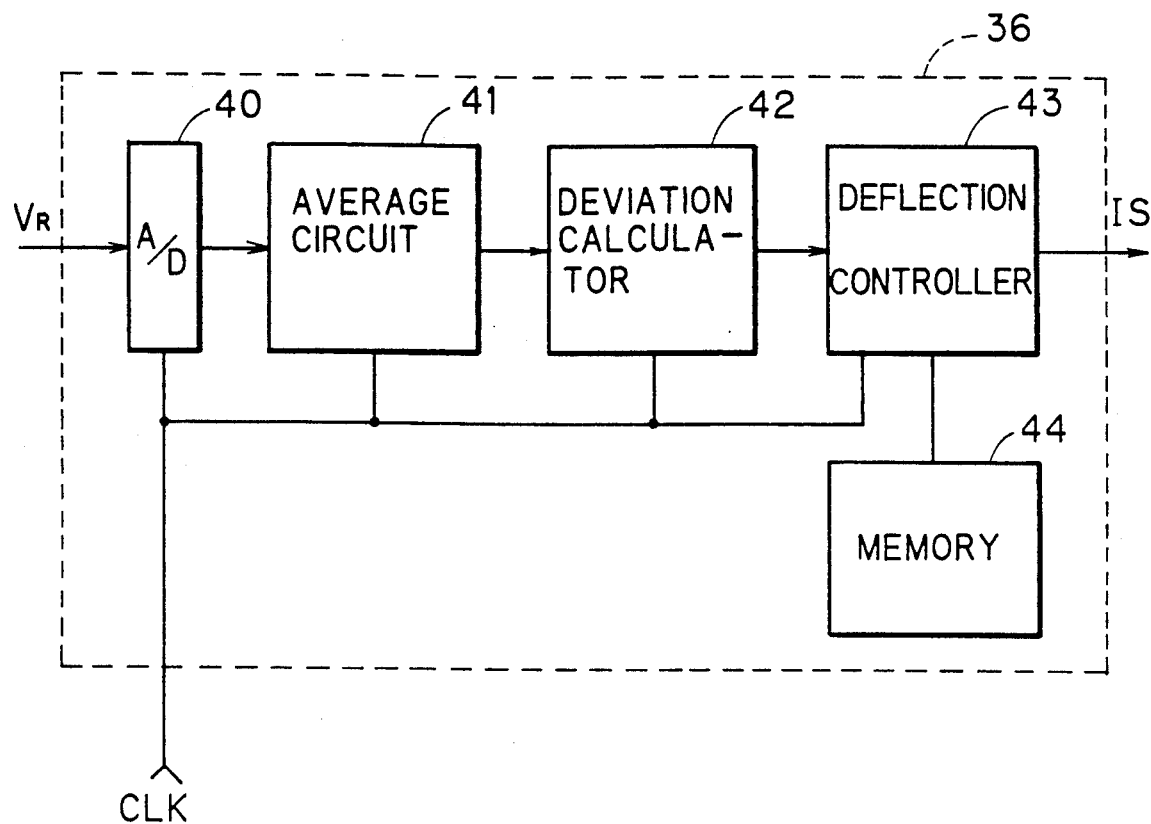
FIG. 7A is a block diagram of a servo unit constructed as a digital circuit.

FIG. 7A is a block diagram showing the servo unit 36 which is constructed as a digital circuit. The signal representing the relative amplitudes $V_R$ is inputted to an analog/digital (A/D) converter 40 and is digitalized therein. The timings of the A/D conversion are controlled by the clock signal CLK generated in the PLL 38. The digital signal $V_R$ is delivered to an average circuit 41. The average circuit 41 is operable to sample the peak level, the flat step level and the bottom level of the digital signal $V_R$ at predetermined times to average each set of the sampled levels. If the sampling is conducted only one time for each of the peak level, the flat step level and the bottom level, the averaging is omitted. The levels thus averaged are transmitted to a deviation calculator 42, in which the index value A is calculated by substituting the averaged levels for the corresponding variables in the equation (5).

A deflection controller 43 which is provided in the next stage receives the index value A to generate the deflection control signal IS for the AOD 27. The deflection controller 43 is connected to a memory or RAM 44 so that an initial value of the signal IS can be stored in and read-out from the address in the memory 44 which is assigned to each mirror surface of the polygon mirror 28.

The initial value of the signal IS is stored and used in order to shorten the time period or initial invalid period in which the inclination correction for the signal IS is not substantially effectuated due to the initial response invalidity of the feedback loop in each mirror surface. In the preferred embodiment, the initial value is defined for each mirror surface by the value of the signal IS at the time point at which the deviation of the deflection from the reference line $Y=0$ comes to zero for the first time, i.e., the time point at which the index value A comes to 0.5 for the first time.

When the mirror surface of the polygon mirror 28 which is reflecting the photobeams 25 and 26 is changed from one mirror surface to another, the deflection controller 43 first reads out the initial value of the signal IS from the memory 44 to give the initial value to the signal IS which is being delivered to the AOD 27. Then, the deflection controller 43 receives the index value A from the deviation calculator 42 and adds the differenece $(A-0.5)$ between A and 0.5 to the signal IS, whereby the value of the signal IS is corrected. The index value A which varies due to the feedback control is compared with the constant value 0.5, and the temporary level of the signal IS is stored in the memory 4 when the index value A comes to 0.5 for the first time. The stored level is used as the initial value for the deflection using the same mirror surface in the next rotation cycle of the polygon mirror 28. This operation is carried out for each mirror surface of the polygon mirror 28.

Through the above-indicated initialization of the signal IS in each rotation of the polygon mirror 28, the index value A becomes stabilized after the polygon mirror 28 is rotated two or three times. Thus, the initial invalid period of the feedback control is sufficiently shortened.

If it is desired to perfectly prevent the initial invalid period, a non-volatile memory such as an EEPROM may be used in place of the RAM 44. In this case, a value suitable for the initial value of the signal IS is previously determined and stored in the non-volatile memory. The stored value is read-out every time the scanning enters a new deflection period for a new scanning line, and is given to the signal IS as an initial value thereof. Since the stored value is not erased even when the power supply for the system is stopped, the stored value can be used when the power supply is re-started and the system is enabled again. The signal IS is stabilized even in the starting period of the control system because the suitable initial value can be obtained from the non-volatile memory.

In the preferred embodiment, the average circuit 42, the deviation calculator 43 and the deflection controller 44 are constructed by digital-signal processors and other devices. The memory 44 may be the internal memory of the digital-signal procerssors, or alternatively, it may be an external memory.

Figure 7B:
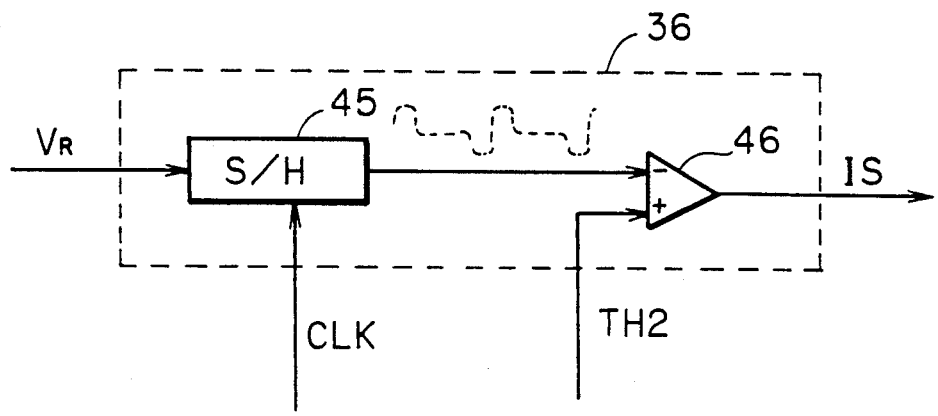
FIG. 7B is a block diagram of the servo unit constructed as an analog circuit.

FIG. 7B is a schematic block diagram showing another example of the servo unit 36, which is constructed as an analog circuit. A sample/hold (S/H) circuit 45 is operable to sample the voltage level of the signal $V_R$ at each flat step of the signal $V_R$ and hold the same in other terms in synchronism with the clock signal CLK. The sampled level is delivered to a subtractor 46 as the negative input thereof. The subtractor 46 is supplied with a threshold signal TH2 at the positive input terminal thereof, the voltage level of the signal TH2 being previously determined so as to represent the value "0.5". The subtractor 46 subtracts the threshold signal TH2 from the sampled level to generate the deflection control signal IS.

Through the control process described above the deviation of the reference beam 26 (FIG. 1A) in the subscanning direction Y due to the inclination of the polygon mirror 28 is monitored on the grating scale 31 and the deflection of the photobeams 25 and 26 in the subscanning direction Y is corrected with the AOD 27, whereby the deviation of the recording beam 25 from a predetermined scanning line on the photosensitive film 600 becomes substantially zero.

Figure 8:
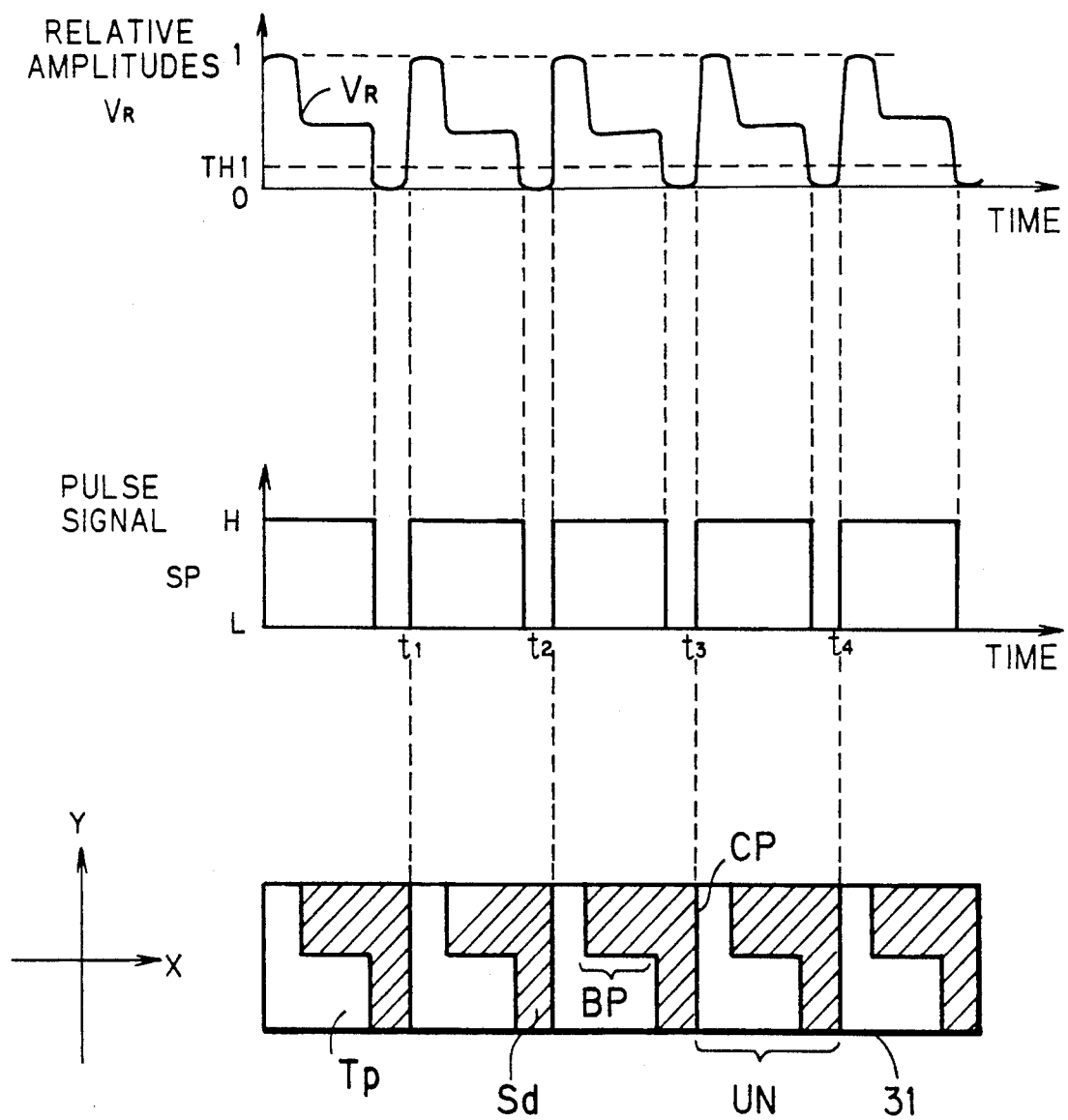
FIG. 8 illustrates a timing chart of a pulse signal SP in connection with the waveform of the signal $V_R$ and the periodic scale pattern.

FIG. 8 illustrates the waveform of the signal $V_R$ and the threshold level TH1 which are supplied to the comparator 37 (FIG. 1A). Also illustrated in FIG. 8 in connection with the signal $V_R$ and the threshold TH1 are the pulse signal SP outputted from the comparator 37 and the respective positions on the grating scale 31. The pulse signal SP is at the "H" level during $V_R > TH1$ and is at the "L" level during $V_R < TH1$. The time points $t_1$, $t_2$, $t_3$ and $t_4$ at which the pulse signal SP rises from the "L" level to the "H" level correspond to the time points at which the reference beam 26 passes through the respective vertiCal boundaries CP of the unit cells UN in the main scanning direction X. The pulse signal SP is delivered to the PLL 38 and the its frequency is increased therein to thereby obtain the clock signal CLK whose oscillation is stabilized. Alternatively, the clock signal CLK may be obtained by delivering the signal $V_0$ to the PLL 38 in place of the signal $V_R$ since the scan timing can be determined regardless of the shading correction.

C. Process Sequence

Figure 9A:
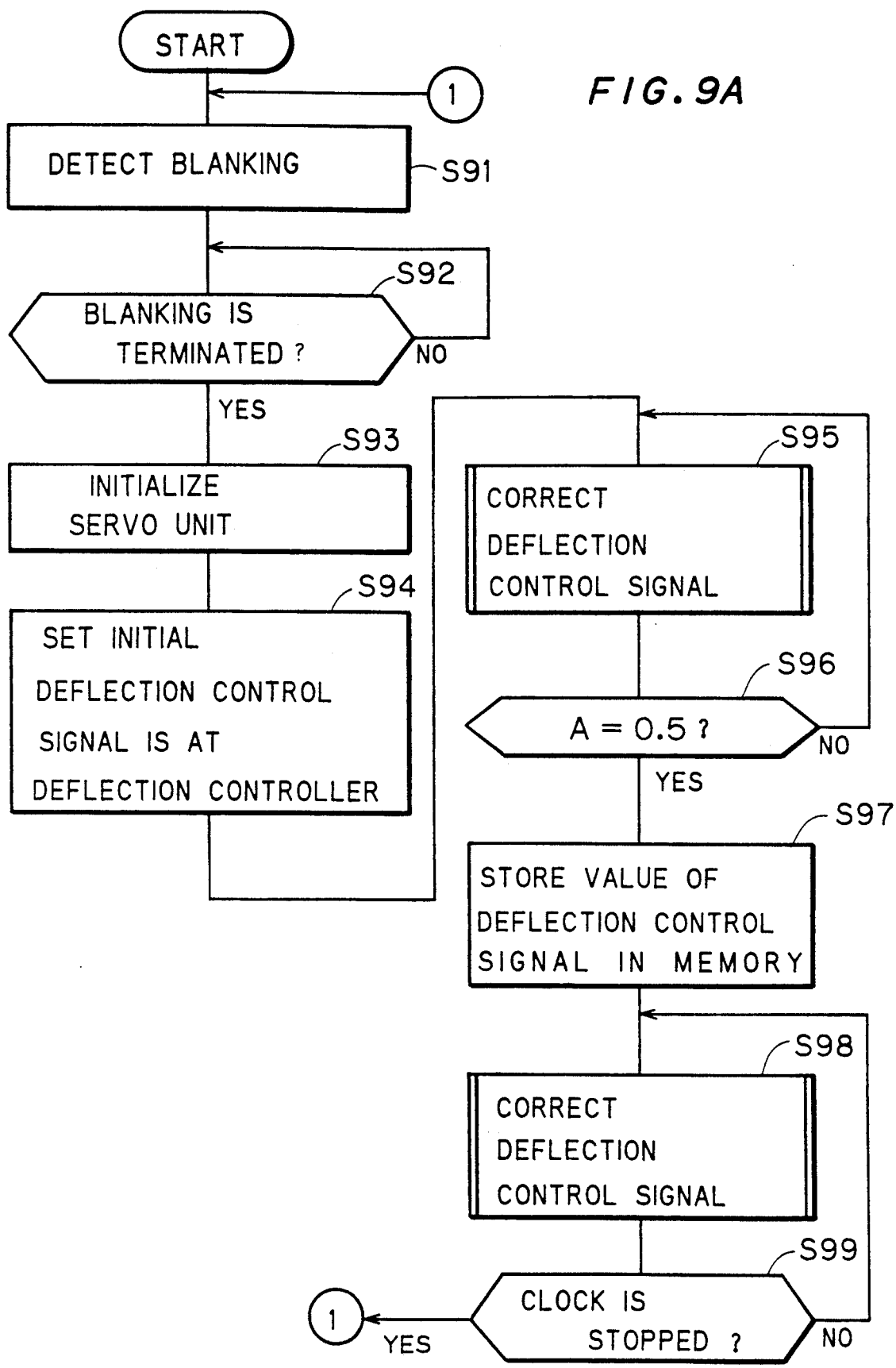
FIG. 9A and FIG. 9B are flow charts showing a process of compensating inclination of mirror surfaces.
Figure 9B:
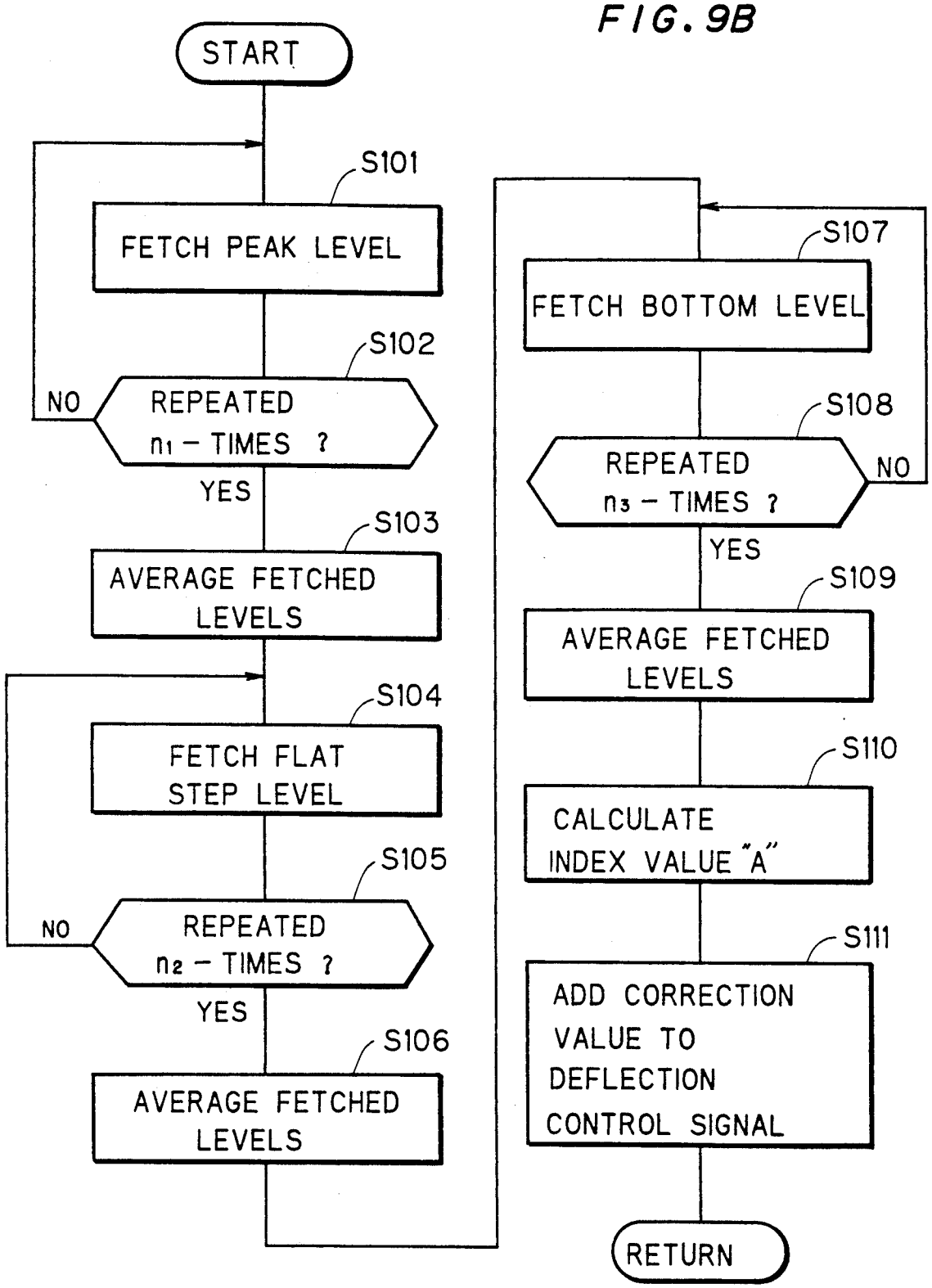

FIG. 9A and FIG. 9B are flowcharts showing the signal processing which is performed in the digital servo unit 36 shown in FIG. 7A.

In response to a start of the power, supply to the scanning beam control system, the polygon mirror 28 (FIG. 1A) starts to rotate. When the rotation speed of the polygon mirror 28 reaches a predetermined speed, e.g., 2000 r.p.m., the servo unit 36 is enabled. In such a system, there are "a scanning period" and "a blanking period" in each time section in which the photobeams 25 and 26 are incident to one of the mirror surfaces. The scanning period is such that the photobeams are effectively scanned, while the blanking period is such that the scanning is invalid and the clock signal CLK is not generated. Therefore, the blanking period is first detected in the process step S91 (FIG. 9A) when the mirror surface receiving the photobeams changes from one mirror surface to another, and the feedback control of the system is suspended until the blanking period is terminated (the process step S92).

When the blanking period is terminated and the clock signal CLK is generated, the control of the system is resumed and the servo unit 36 is initialized (the process step S93). More particularly, the digital signal processors in the servo unit 36 are subjected to initial reset thereof. In the next process step S94, the initial value of the signal IS is read-out from the address of the memory 44 corresponding to the mirror surface which is receiving the photobeams 25 and 26. This initial value is a value which was obtained in the previous control period for the same mirror surface. The initial value is set in the deflection controller 43. The deflection controller 43 gives the initial value to the signal IS, and transmittes transmits the signal IS to the AOD 27 in order to deflect the photobeams 25 and 26 in the initial control period.

The following process steps S95 through S98 are directed to substantial compensation of the mirror inclination. First, the process step S95 is conducted for the compensation, details of which are shown in FIG. 9B.

Referring to FIG. 9B, the peak level of the signal $V_R$ is sampled $n_1$-times (the process steps S101 and S102), where $n_1$ is an integer larger than one, e.g., $n_1 = 2$. As has been described, the peak level represents the optical amount which is transmitted to the photodiode 33 when the whole of the beam spot BS is on the transparent area $T_p$. The sampled levels are averaged in the average circuit 41 (the process step S103).

Similar sampling and averaging is also performed with respect to the flat step level and the bottom level of the signal $V_R$ (the process steps S104–109), where the numbers of the sampling are $n_2 = 4$ for the flat step level and $n_3 = 2$ for the bottom level. In general, the numbers $n_3$ and $n_4$ are larger than one. The respective averaged levels for the flat step level and the bottom level represent the optical amounts which are received by the photodiode 33 when the beam spot BS is on the boundary BP and on the opaque area $S_d$, respectively.

The averaged levels which are obtained in the process steps S101–S109 are substituted for the variables in the equation (5), whereby the index value A is calculated (the process step S110). Although the averaging process is employed in the preferred embodiment in order to improve the reliability of the index value A, each of the peak level, the flat step level and the bottom level may be sampled only one time and the averaging process may be omitted.

Then, the difference $(A - 0.5)$ between the calculated index value A and the reference value 0.5 is added to the current deflection control signal IS as the correction value, to thereby correct the deflection angle of the photobeams 25 and 26 (the process step S111). If the correction value $(A - 0.5)$ is a negative value, the deflection control signal IS is decreased by the correction. That is, if the beam spot BS is above the reference line $Y = 0$, the beam path of the photobeams 25 and 26 is downwardly corrected. On the ohter hand, if the correction value is positive, the level of the signal IS is increased and the beam path is upwardly corrected.

Referring to FIG. 9A again, the index value A is compared with the reference value 0.5 in the next process step S96. The process steps S95 and S96 are repeated until the index value A becomes 0.5. When the index value A becomes 0.5, the value of the signal IS is stored at the address in the memory 44 which is assigned to the mirror surface which is receiving the photobeams (the process step S97). The stored value will be used in the control period for the same mirror surface in the next rotation cycle of the polygon mirror 38.

Then, the next process step S98 which has the same contents with the process step S95 is repeated through the process step S99 until the scanning with the current mirror surface is terminated. Consequently, the inclination of the mirror surface is well compensated.

When the reference beam 26 goes out of the grating scale 31, which corresponds to the effective scanning, the generation of the clock signal CLK is suspended and the blanking period is started again. The repetition of the process step S98 is stopped in response to the stop of the clock signal CLK and the process returns to the process step S91 in order to repeat the process sequence for the next mirror surface (the process step S99).

The process sequence S91-S99 is repeated for each mirror surface and for each scanning line, whereby the feedback control is conducted until the image recording on the photosensitive film 600 is terminated.

Therefore, the inclination of the mirror surfaces in the polygon mirror 28 is well compensated by the feedback control according to the preferred embodiment.

D. Other Preferred Embodiments

Figure 10:
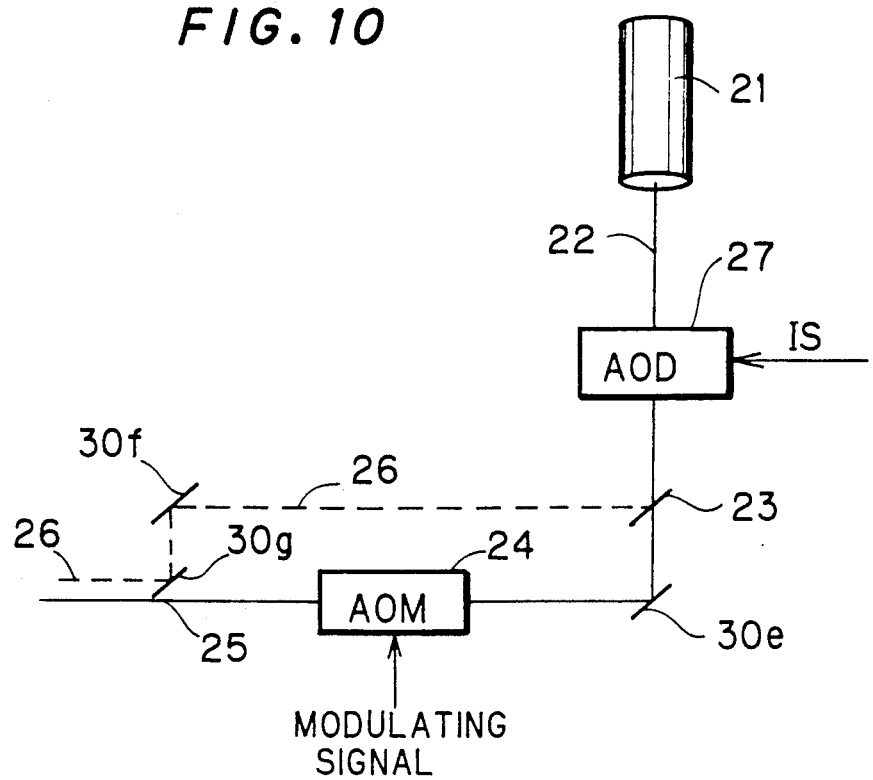
FIG. 10 illustrates a modification of the scanning beam-controlling system.

FIG. 10 is a partial diagram showing a modified part of the scanning beam control system shown in FIG. 1A. The photobeam 22 generated in the light source 21 is first supplied to the AOD 27, and then split into the photobeams 25 and 26 at the half mirror 23. The recording beam 25 is reflected by a mirror 30e and modulated by the AOM 24. On the other hand, the reference beam 26 is reflected by the mirrors 33f and 30g to bypass the AOM 24. That is, the AOD 27 is operable to deflect the photobeam 22 before the photobeam 22 is split into two photobeams 25 and 26. Since the respective functions of the AOD 27 and the AOM 24 are independent, such an arrangement of the elements 27 and 24 can be also employed in the present invention.

Figure 11:
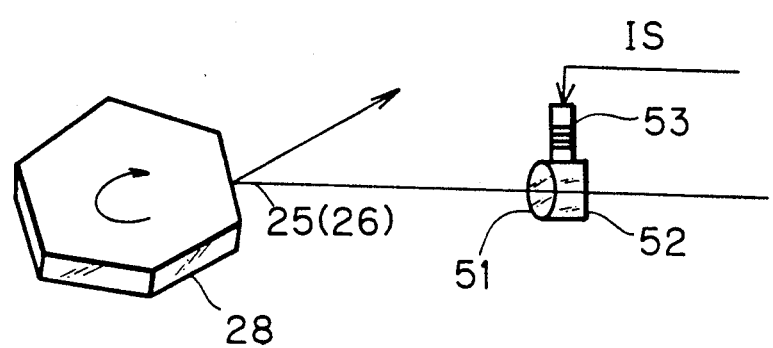
FIG. 11 illustrates another modification in which a piezo-electric deflector is employed for compensating deflection error.

FIG. 11 is a diagram showing a construction in which a piezo-electric deflector is employed in place of the AOD 27. A lens 51 is inserted into the light path of the photobeams 25 and 26 so that the photobeams 25 and 26 pass through the lens 51 before the same are deflected by the main deflector or the polygon mirror 28. The optical axis of the lens 51 is parallel to the light path. The lens 51 is fixed to a piezo-electric element 52 to which an electric voltage is applied from a piezo-driver 53, so that the lens 51 is movable in the vertical direction perpendicular to the light path by applying a voltage to the piezo-electric element 52.

When the position of the lens 51 in the vertical direction is such that the optical axis of the lens 51 is just on the light path, the photobeams 25 and 26 pass through the lens 51 without being refracted. When the lens 51 is moved upward, the optical axis and the focal position of the lens 51 are also moved upward. Consequently, the photobeams 25 and 26 are refracted so as to pass through the focal point which is moved upward, which is equivalent to an upward deflection of the photobeams 25 and 26. On the other hand, when the lens 51 is moved downward, the photomeans 25 and 26 are retracted or deflected downward. Therefore, the inclination of the mirror surfaces in the polygon mirror 28 can be compensated by delivering the deflection correction signal IS to the piezo-driver 53.

Figure 12A:
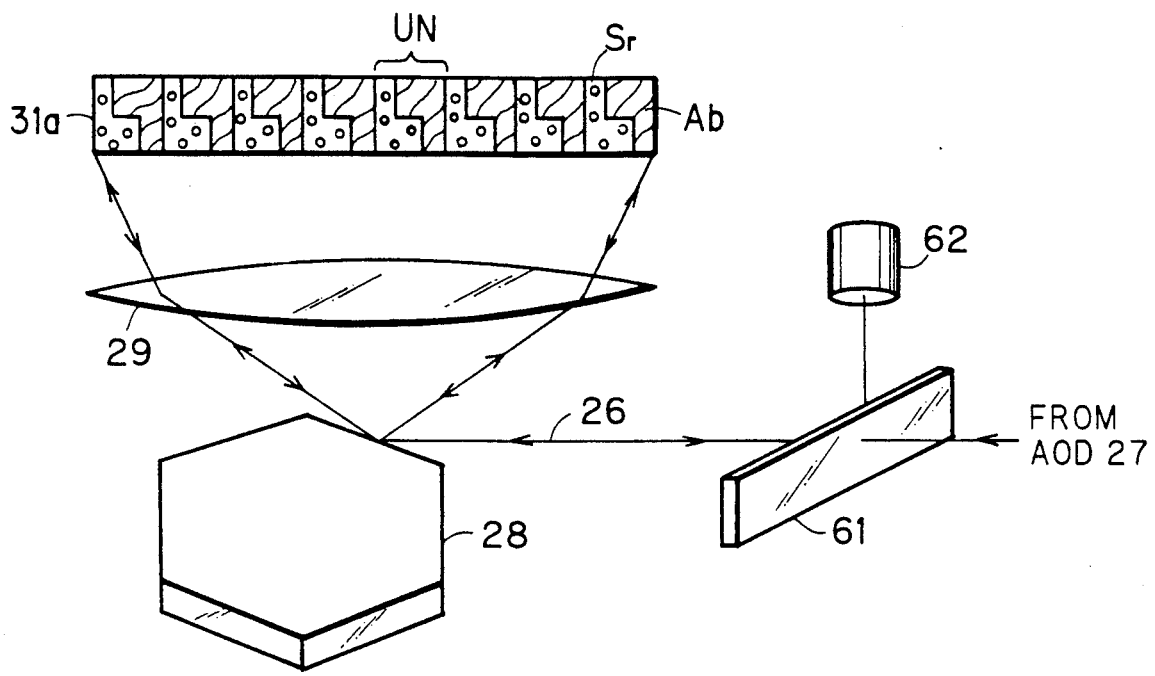
FIG. 12A and FIG. 12B illustrate modifications of the periodic scale pattern in optical characters thereof together with associated modifications in optical paths.
Figure 12B:
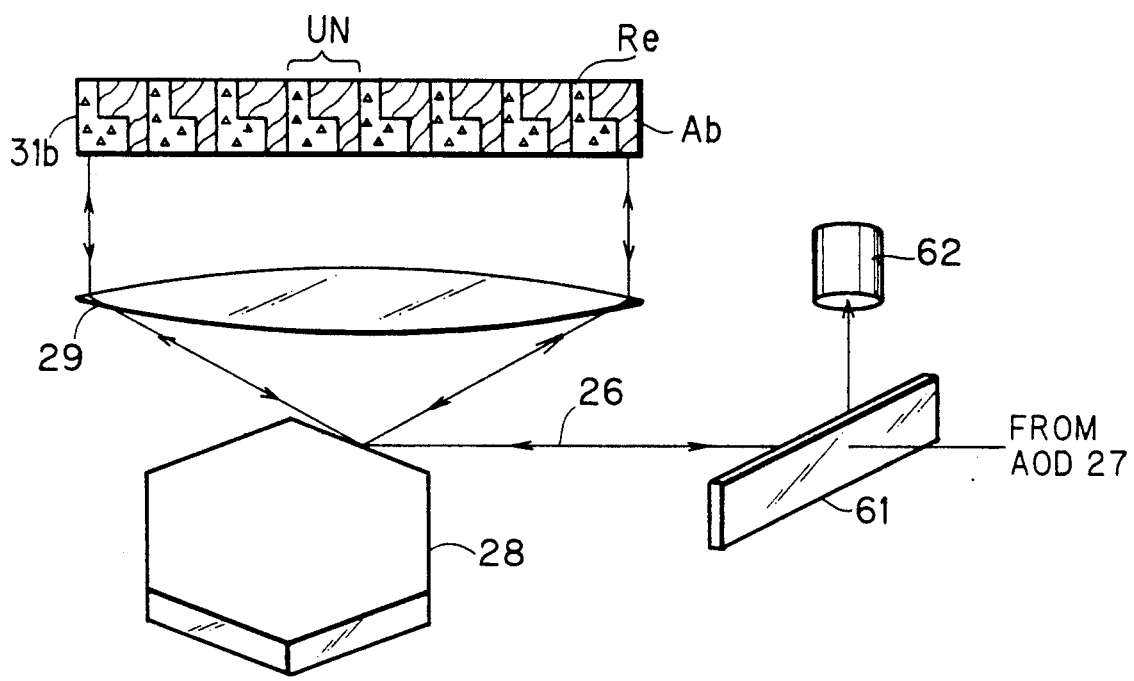

FIG. 12A and FIG. 12B are diagrams showing modifications of the grating scale. The grating scale 31a shown in FIG. 12A has a face plane on which photo-diffusive areas $S_r$ and photo-absorptive area $A_b$ are aligned alternately. The respective shapes of the areas $S_r$ and $A_b$ are the same with the transparent area $T_p$ and the opaque area $S_d$ shown in FIG. 3A. Therefore, the unit pattern UN in FIG. 12A consists of one photo-diffusive area $S_r$ and one photo-absorptive area $A_b$. The reference beam 26 projected onto the grating scale 31a is diffused at the photo-diffusive area $S_r$. Since the diffusion is substantially isotropic, a part of the diffused light returns to a half mirror 61 through the lens 29 and the polygon mirror 28. The part of the diffused light is partially reflected by the half mirror 51 to enter a photo-electric converter 62. Since the optical amount of the diffused light varies depending on the position of the beam spot formed on the grating scale 31a similarly to that of the light transmitting through the transparent area $T_p$ of the grating scale 31 shown in FIG. 3A, the electric signal obtained in the photo-electric converter 62 has a waveform comparable to the signal $V_0$ shown in FIG. 4C. Therefore, the detection and the compensation of the scanning deviation can be attained by generating the deflection correction signal on the basis of the electric signal output from the photo-electric converter 62.

In the example shown in FIG. 12B, total-reflective areas $R_e$ are employed in place of the photo-diffusive areas $S_r$. The lens 29 and other optical elements are telecentric ones, so that the reference beam 26 is always projected onto the grating scale 31b in a direction perpendicular to the face plane of the grating scale 31b and the whole of the light reflected at the total-reflective area Re is led to the photo-electric converter 62. Therefore, the level of the electric signal output the photo-electric converter 62 is increased as compared with the system shown in FIG. 12A. The waveform of the electric signal output from the photo-electric converter 62 is the same with the signal $V_0$ shown in FIG. 4C except for the level magnification thereof. In both of the systems shown in FIG. 12 A and FIG. 12B, the non-uniformity in peak levels of the electric signals are compensated in the shading correction circuit (not shown in FIG. 12A and FIG. 12B).

Figure 13:
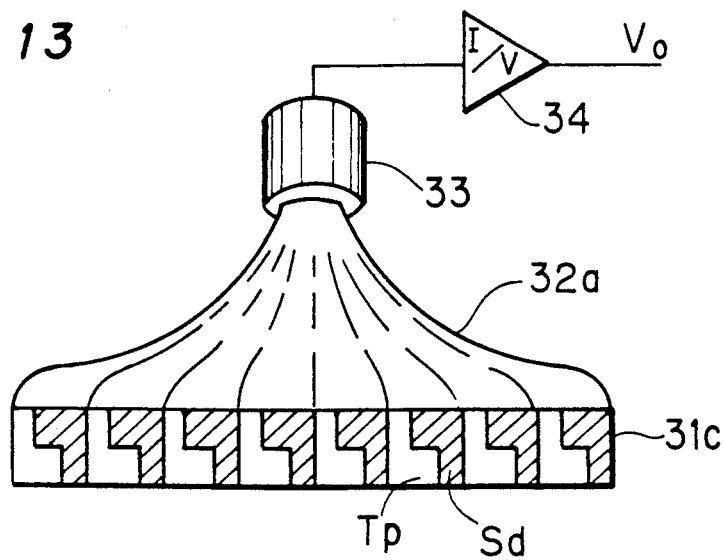
FIG. 13 illustrates another scale structure employing a bundle of optical fibers.

FIG. 13 illustrates a grating structure 31c in which the reference beam transmitted through the transparent area $T_p$ is guided through a bundle of optical fibers 32a rather than an optical guide rod. Respective one terminals of the optical fibers 32a are connected to the rear surface of the grating scale 31, where respective connection points are distributed on the rear surface of the grating scale 31 at a uniform distribution density. Alternately, the optical fibers may be connected to only parts of the rear surface of the grating scale 31c corresponding to the transparent areas $T_p$ at a uniform distribution density. In both cases, the respective other terminals of the optical fibers 32a are connected to the photo receiving aperature of the photo-diode 33, whereby the transmitted reference beam can be guided to the photo diode 33 at a high efficiency. The structure other than the shown part may be the same with the system shown in FIG. 2A.

The present invention can be also applied to a system employing a galvano mirror, a hologram disc or the like as the main deflector.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A system for controlling scanning of a photobeam along scanning lines defined on an object plane, comprising:
   means for generating first and second photobeams propagating in parallel with each other, and first deflector means electrically controllable for deflecting said first and second photobeams in a first direction;
   second deflector means for periodically deflecting said first and second photobeans in a second direction;
   separator means for separating said first and second photobeams from each other so that said first photobeam is directed to said object plane and said second photobeam is directed to a predetermined first space region;
   scale means provided at said first space region for receiving said second photobeam, having a first surface on which a periodic scale pattern extending in said second direction is formed, wherein said periodic scale pattern essentially consists of a linear periodic array of unit patterns each of which includes a spatial combination of first and second areas whose optical characters are different from each other, and a combination boundary of said first and second areas includes a first portion parallel to said second direction,
   photoelectric means for receiving a light transmitted from said scale means and photo-electrically converting said light into a first electric signal;
   circuit means for receiving said fist electric signal and calculating a first difference between a level of said first electric signal and a first threshold level to generate a second electric signal in accordance with said first difference; and
   means for transmitting said second electric signal to said first deflector means in order to change respective deflection angles of said first and second photobeams in said first direction.

2. A system of claim 1, wherein
   said combination boundary further includes second and third portions extending from respective ends of said first portion in a third direction different from said second direction.

3. A system of claim 2, wherein
   said third direction is perpendicular to said second direction.

4. A system of claim 2, wherein
   said third direction is inclined from a direction perpendicular to said second direction toward said second direction.

5. A system of claim 1, wherein
   said scale means includes a transparent body member having said first surface on which said periodic scale pattern is formed;
   said first area is a transparent area; and
   said second area is an opaque area;
   said system further comprising:
   optical guide means for guiding said second photobeam transmitted through said transparent body member to said photoelectric means as said light.

6. A system of claim 5, wherein
   said transparent body member has a second surface which is formed on an opposite side of said first surface across said transparent body member; and
   said light is received by said photo-electric means through said second surface.

7. A system of claim 6, wherein
   said optical guide means has an optical guide rod attached to said second surface so that an axial direction of said optical guide rod is parallel to said second direction.

8. A system of claim 6, wherein
   said optical guide means has optical fibers optically connecting said second surface to said photoelectric means.

9. A system of claim 1, wherein
   said first area is a photo-reflective area reflecting said second photobeam as said light;
   said second area is a photo-absorptive area;
   said system further comprising:
   telecentric lens means provided between said second deflector means and said scale means, for reflecting said second beam into a fourth direction perpendicular to said first surface; and
   half mirror means provided at a predetermined position in a light path of said second photobeam between said first and second deflector means for receiving said light coming back from said photo-reflective area to said predetermined position through said telecentric lens means and said first deflector means and for reflecting a part of said light to a predetermined third space region;
   said photoelectric means being provided in said third space region to receive said part of said light.

10. A system of claim 9, wherein
    said photo-reflective area is a total-reflective area.

11. A system of claim 1, wherein
    said first area is a photo-diffusive area diffusing said second photobeam as said light;
    said second area; is a photo-absorptive area,
    said system further comprising:
    half mirror means provided at a predetermined position in a light path of said second photobeam between said first and second deflector means, for receiving said light coming back from said photo-diffusive area to said predetermined position through said first deflector means and for reflecting a part of said light to a predetermined third space region;
    said photoelectric means being provided in said third space region to receive said part of said light.

12. A system of claim 1, wherein
    said circuit means comprises:
    peak detector means for detecting respective peak levels in said first electric signal; and
    correction means for correcting said first electric signal so that said respective peak levels are normalized into a predetermined constant level.

13. A system of claim 12, wherein
    said first electric signal has a waveform in which a peak, a flat step and a bottom valley are serially repeated for each time period, said time period being a period in which said second photobeam scans one of said unit patterns in said second direction; and
    said circuit means further comprises:
    level detector means for receiving said first electric signal whose respective peak levels are normalized to detect a peak level, a flat step level and a bottom level of said first electric signal for said each time period;

means for calculating a second difference between said peak level and said flat step level and a third difference between said peak level and said bottom level and further calculating a ratio of said second difference to said third difference to obtain an index value; and means for calculating said first difference by subtracting said first threshold value from said index value to generate said second electric signal.

14. A system of claim 13, wherein
said level detector means includes:
means for sampling a first plurality of levels in said flat step of said first electric signal; and
means for averaging said first plurality of levels to obtain said flat step level.

15. A system of claim 14, wherein
said level detector means further includes:
means for sampling a second plurality of levels in said peak of said first electric signal;
means for sampling a third plurality of levels in said bottom valley of said first electric signal;
means for averaging said second plurality of levels to obtain said peak level; and
means for averaging said third plurality of levels to obtain said bottom level.

16. A system of claim 15, wherein
said circuit means further comprises:
memory means;
first comparator means for comparing said index value with said first threshold value;
means for detecting a level of said second electric signal and storing said level of said second electric signal in said memory means as a reference level when said index value coincides with said first thershold value;
means for reading-out said reference level from said memory means when a deflection of said first and second photobeams in said second direction with said second deflector means enters a new deflection period which follows a deflection period in which said reference level is stored in said memory means wherein said deflection period is a time interval required for said first photobeam to scan one scanning line; and
means for giving said reference level to said second electric signals as an initial level when said deflection enters said new deflection period.

17. A system of claim 16, wherein
said second deflector means has a polygon mirror having a plurality of mirror surfaces and being rotated so that said plurality of mirror surfaces cyclically receive said first and second photobeams; and
said reference level is individually obtained and given to said second signal for each of said plurality of mirror surfaces.

18. A system of claim 15, wherein
said circuit means further includes:
memory means in which a reference level of said second electric signal is previously stored;
means for reading-out said reference level from said memory means when a deflection of said first and second photobeams in said second direction with said second deflector means enters each deflection period, wherein said each deflection period is a time interval required for said first photobeam to scan one scanning line; and
means for giving said reference level to said second electric signals as an initial level every time said deflection enters said each deflection period.

19. A system of claim 13, further comprising:
second comparator means for comparing respective temporary levels of said first electric signal with a predetermined second threshold level to binarize said first electric signal; and
means for increasing a frequency of a binarized first electric signal to obtain a clock signal used for controlling an operation timing of said circuit means.

20. A system of claim 1, wherein
said means for generating said first and second photobeams includes:
a light source generating an original photobeam;
a beam splitter splitting said original photobeam into two photobeams;
modulator means for modulating one of said two photobeams in accordance with a given signal to obtain a modulated photobeam; and
coupler means for coupling said modulated photobeam with the other of said two photobeams so that said modulated photobeam and the other of two photobeams propagate in parallel as said first and second photobeams, respectively;
said first deflector means being provided between said coupler means and said second deflector means.

21. A system of claim 1, wherein
said means for generating said first and second photobeams includes:
a light source generating an original photobeam;
a beam splitter splitting said original photobeam into two photobeams;
modulator means for modulating one of said two photobeams in accordance with a given signal to obtain a modulated photobeam; and
coupler means for coupling said modulated photobeam with the other of said two photobeams so that said modulated photobeam and the other of two photobeams propagate in parallel as said first and second photobeams, respectively;
said first deflector means being provided between said light source and said beam splitter to deflect said original photobeam in said first direction, said first and second photobeams being deflected in said first direction due to a deflection of said original photobeam.

* * * * *